United States Patent Office 2,770,523
Patented Nov. 13, 1956

2,770,523

FERRO-MAGNETIC COBALT AND NICKEL MANGANESE OXIDES HAVING THE ILMENITE-TYPE CRYSTAL STRUCTURE

Richard C. Toole, Grand Island, N. Y., assignor to E. I. du Pont de Nemours and Company, Wilmington, Del., a corporation of Delaware No Drawing. Application August 26, 1954, Serial No. 452,449

13 Claims. (Cl. 23—58)

This invention relates to new ferromagnetic crystalline compounds and more particularly to new ferromagnetic crystalline oxides of manganese and to their preparation.

Ferromagnetic materials are very useful in a variety of applications. In some of these applications, especially those requiring magnetic materials of low loss characteristics at high frequencies, or of relatively high coercive force, ferromagnetic oxides are normally more useful than ferromagnetic metals. In view of the extremely small number of known ferromagnetic oxides, it is highly desirable to discover new oxides of this type.

It is an object of this invention to provide new ferromagnetic crystalline compounds. A further object is to provide new ferromagnetic crystalline oxides of manganese and methods for their preparation. Other objects will appear hereinafter.

These and other objects of this invention are accomplished by providing new compounds which are complex oxides of manganese and a metal of group VIII of the periodic table having an atomic number of 27 to 28, inclusive, characterized by being ferromagnetic and having an ilmenite-type crystal structure. The chemical composition of these new compounds can be represented by the formula $MMnO_3$, wherein M is Co, or Ni. The ratio of atoms of metal M to atoms of Mn may deviate slightly from the ratio of 1:1 as in the known ilmenite-type oxides.

The crystal structure of the products of this invention is of the ilmenite-type. By this term is meant that the products have the same type of crystal structure as ilmenite, $FeTiO_3$, which has trigonal symmetry. This crystal structure is defined in Wyckoff's "Crystal Structures," Interscience Publishers (1951), chapter V,a5. In the known ilmenite-type oxides the ratio of the two metal atoms may deviate slightly from 1:1, but with the ratio of a total of two metal atoms to three oxygen atoms remaining substantially constant. The structure of a specific example of the ilmenite-type crystal is uniquely distinguished by the value of the two cell parameters $a_0$ and $c_0$.

The ferromagnetic, ilmenite-type oxides of this invention are prepared by heating a mixture of manganese dioxide and a simple oxide of cobalt or nickel at a temperature of at least 500° C. and under a pressure of at least 1000 atmospheres. A simple oxide contains only one different kind of atom in addition to oxygen whereas a complex oxide contains at least two different kinds of atoms in addition to oxygen. (Wells, "Structural Inorganic Chemistry," second edition, Clarendon Press, Oxford, England (1950), page 371.)

The ferromagnetic oxides of this invention are preferably prepared in a reaction vessel or container constructed of a material which is inert to the reactants under the reaction conditions, e. g., platinum. The container can be either a completely sealed tube having flexible walls or a cylindrical tube closed at one end and fitted at the other end with a closely fitting piston so that the desired pressure can be exerted on the reaction mixture.

The reactor is charged with a mixture of manganese dioxide and a simple oxide of a metal of group VIII of the periodic table having an atomic number of 27 to 28 inclusive, e. g., cobaltous-cobaltic oxide, $Co_3O_4$, or black nickel oxide, NiO. After the corrosion-resistant container is charged with the reactants and an aqueous medium, if one is used, it is closed and placed inside a larger water-filled vessel capable of withstanding high temperatures and pressures. The outer vessel is then closed and the water pressure raised to at least 1000 atmospheres and the temperature of the reaction mixture is raised to at least 500° C. Preferably the pressure is maintained at from 2000 to 5000 atmospheres. Even higher pressures can be used if desired, provided the reaction vessel is capable of withstanding such pressure.

The operating temperature ranges broadly from 500° to 800° C., the preferred operating temperature being from 550° to 700° C.

Reaction times are not critical, periods ranging from one to three hours at the above-specified temperatures are generally suitable. In general, the shorter reaction times are employed with the higher reaction temperatures, since excessive heating at the highest temperatures tends to produce some decomposition of the ferromagnetic oxide.

The ferromagnetic oxides can be separated from non-magnetic by-products by physical means. The solid reaction product can be removed from the reaction vessel and ground to a fine powder, and this powder then suspended in water. The ferromagnetic portion of the reaction mixture can then be extracted by means of permanent magnets.

The invention is illustrated in further detail by the following examples, in which the proportions of ingredients are expressed in parts by weight unless otherwise noted.

Example I

Finely divided cobaltous-cobaltic oxide, $Co_3O_4$, 3.35 parts, and manganese dioxide, $MnO_2$, 3.50 parts (approximately 1:3 mole ratio) are blended together and added with water to a platinum tube of about one-half inch diameter and five and one-half inches long with one end closed. The open end of the charged tube is closed off by first sliding in a snugly fitting platinum piston and then placing a thin platinum cap over the end of the tube. This tube and its contents are then placed in a water-filled steel bomb which is heated and pressured to 625° C. and 3000 atmospheres. After holding at these operating conditions for three hours, the apparatus is disassembled and the solid reaction product in the platinum tube is isolated by filtration and drying.

The dry reaction product is ground into a fine powder which is then dispersed in water. The ferromagnetic portion of the reaction mixture is extracted by means of a permanent magnet. The ferromagnetic portion is cobalt manganese oxide which has an ilmenite-type crystal structure with cell parameters of $a_0=4.93$ and $c_0=13.77$. The ferromagnetic product exhibits an X-ray diffraction pattern having the reflection lines listed in the following table. In this table the column headed "$d$" gives the interplanar spacing in A. units, the column headed "I" gives the relative reflection intensities based on a value of 10 for the strongest reflection.

| d | I | d | I | d | I |
|---|---|---|---|---|---|
| 4.08 | 0.5 | 2.11 | 2 | 1.424 | 6 |
| 3.63 | 6 | 1.813 | 6 | 1.391 | 2 |
| 2.68 | 10 | 1.783 | 1 | 1.354 | <0.5 |
| 2.467 | 8 | 1.685 | 3 | 1.304 | 5 |
| 2.311 | 2 | 1.677 | 8 | 1.295 | 2 |
| 2.286 | 2 | 1.590 | 2 | 1.233 | 3 |
| 2.173 | 5 | 1.461 | 5 | 1.209 | 2 |
|  |  |  |  | 1.198 | 1 |

The $d$ values agree with those of a theoretically calculated ilmenite pattern ($a_0=4.93$, $c_0=13.77$) to within at least 0.01 A. unit for values of $d$ greater than 2.00 and to within at least 0.004 A. for values of $d$ less than 2.0. The relative intensities are in qualitative agreement with those observed for known ilmenites, such as the nickel, copper, iron, magnesium, manganese, and cadmium titanates. In addition to the ilmenite pattern listed above, this product exhibits a moderately strong manganese dioxide pattern, a weak $Co_3O_4$ pattern and five very weak unidentified lines.

Chemical analysis of the magnetically separated product indicates the formula $CoMnO_3$ which is also characteristic of the ilmenite-type structure.

The ferromagnetic Curie temperature (i. e., the temperature above which the spontaneous magnetic moment vanishes) of this cobalt manganese oxide is 124° C., whereas the ferromagnetic Curie temperature of metallic cobalt is over 1100° C. The ferromagnetic property of the cobalt manganese oxide is a characteristic of this oxide itself and is not caused by the presence of metallic cobalt, since if any metallic cobalt were present the Curie temperature of the product would be over 1100° C.

*Example II*

Finely divided cobaltous-cobaltic oxide, 2.4 parts, and manganese dioxide, 2.6 parts (approximately 1:3 mole ratio), and 1.5 parts of a 5% aqueous solution of sulfuric acid (30% of the weight of the total metal oxides) are sealed into a flexible platinum tube three-eighths inch in diameter and five inches long by fusing the crimped ends of the tube shut with an oxy-gas torch. The tube and its contents are then heated in a water-filled pressure vessel at a temperature of 625° C. and 3000 atmospheres water pressure for three hours.

There is isolated from the reaction vessel 4.72 parts of a highly crystalline black product from which, after grinding and separation by magnetic means, is isolated approximately 3.5 parts of the ferromagnetic ilmenite-type cobalt manganese oxide, $CoMnO_3$. There is also liberated during the reaction 0.17 part of oxygen. This amount of oxygen, which is determined as loss in weight of reaction mixture after gaseous products are released by puncturing reactor, agrees with that theoretically required by the following equation:

$$Co_3O_4 + 3MnO_2 \rightarrow 3CoMnO_3 + \tfrac{1}{2} O_2$$

A sample of cobalt manganese oxide prepared in the manner of Example II exhibits a coercive force (the magnetic field necessary to reduce the residual magnetism of a previously saturated specimen to zero) of 150 oersteds after magnetization in a 14,000 gauss field. The coercive force of 150 oersteds of this oxide is in the range which is useful for manufacture of magnetic recording tape.

*Example III*

A 25% aqueous paste containing 5.78 parts of nickel oxide hemihydrate ($NiO \cdot \tfrac{1}{2} H_2O$) and 2.50 parts of manganese dioxide powder (approximate mole ratio equals 1:1.7) are blended together and placed in a platinum tube of about one-half inch diameter and five and one-half inches long with one end closed. The open end of the charged tube is closed off by first sliding in a snugly fitting platinum piston and then placing a thin platinum cap over the end of the tube. This tube and its contents are then placed in a water-filled steel bomb which is heated and pressured at 625° C. and 3000 atmospheres. After holding at these operating conditions for three hours, the apparatus is disassembled and the solid reaction product in the platinum tube is isolated by filtration and drying. There is obtained 3.80 parts of crude reaction product containing magnetic material.

This product gives the following X-ray diffraction pattern which is characteristic of ilmenite-type compounds.

| d | I | d | I | d | I |
|---|---|---|---|---|---|
| 2.69 | 4 | 1.80 | 7 | 1.306 | 4 |
| 2.25 | 1 | 1.66 | 10 | 1.294 | 4 |
| 2.15 | 6 | 1.57 | 1 | 1.23 | 4 |
| 2.11 | 1 | 1.45 | 6 | 1.20 | 3 |
|  |  |  |  | 1.14 | 3 |

The product also exhibits eight, moderately strong unidentified lines.

*Example IV*

A platinum tube of the type used in Example II, but only 0.25 inch in diameter and 1.5 inches long, is charged with 0.25 part of black nickel oxide, 0.24 part of manganese dioxide (approximately 1.2:1 mole ratio) and 0.15 part of 5% aqueous sodium hydroxide solution. The platinum tube and its contents are heated at 525° C. and 3000 atmospheres pressure in a water-filled steel bomb for two hours.

After cooling and disassembling of the bomb, there is obtained a solid ferromagnetic product. X-ray analysis of this product indicates the presence of an ilmenite-type crystal structure with cell parameters of $a_0=4.91$ and $c_0=13.61$. An X-ray pattern consisting of the fifteen lines listed in the following table is exhibited by this phase which is indicated to have the formula $NiMnO_3$, a stoichiometry typical of ilmenite-type oxides.

| d | I | d | I | d | I |
|---|---|---|---|---|---|
| 4.55 | 1 | 2.263 | 1 | 1.452 | 2 |
| 3.61 | 5 | 2.159 | 3 | 1.416 | 3 |
| 2.65 | 10 | 1.799 | 4 | 1.295 | 2 |
| 2.453 | 7 | 1.663 | 7 | 1.223 | 0.5 |
| 2.296 | 0.5 | 1.562 | 0.5 | 1.142 | 1 |

In addition to the above lines of the ilmenite pattern, the product exhibits a moderately strong NiO pattern and two very weak unidentified lines.

Ferromagnetic nickel manganese oxides are also prepared in two other experiments by the general procedure described in Example IV with the exceptions that in one case 0.15 part of 5% aqueous sulfuric acid is used instead of the 5% aqueous sodium hydroxide, and in the other run 0.23 part of black nickel oxide and 0.27 part of manganese dioxide are used instead of 0.25 and 0.24 part, respectively, and in which the reaction is carried out at 625° C. instead of 525° C. The ferromagnetic portions of all three reaction products are combined and the Curie temperature of the composite product is found to be 164° C. The Curie temperature of metallic nickel is 358° C. This indicates that the ferromagnetic property of the ilmenite-type nickel manganese oxide is not due to the presence of metallic nickel.

A composite sample of six lots of nickel manganese oxide prepared by reaction of 0.20 to 0.25 part of black nickel oxide with 0.24 to 0.30 part of manganese dioxide under the conditions described in Example IV exhibits a coercive force, after magnetization in a field of 14,000 gauss, of 400 oersteds. Nickel manganese oxide of this coercive force is useful in making permanent magnets.

*Example V*

Finely divided cobaltous-cobaltic oxide, $Co_3O_4$, 3.35 parts, and manganese dioxide, $MnO_2$, 3.50 parts (approximately 1:3 mole ratio) are blended together and added with water to a platinum tube of about one-half inch diameter and five and one-half inches long with one end closed. The open end of the charged tube is closed off by first sliding in a snugly fitting platinum piston and then placing a thin platinum cap over the end of the tube.

This tube and its contents are then placed in a water-filled steel bomb which is heated and pressured to 625° C. and 3000 atmospheres. After holding at these operating conditions for three hours, the apparatus is disassembled and the solid reaction product in the platinum tube is isolated by filtration and drying.

The product is ferromagnetic and the X-ray diffraction pattern obtained with it has the following diffraction lines:

| d | I | d | I | d | I |
| --- | --- | --- | --- | --- | --- |
| 3.62 | 1 | 2.47 | 2 | 2.11 | 1 |
| 2.68 | 3 | 2.17 | 1 | 1.68 | 1 |

These particular lines indicate that the product contains material having an ilmenite-type crystal structure. The product also exhibits a strong $Co_3O_4$ pattern, a moderately weak $MnO_2$ pattern and one unidentified line.

The commercially available cobaltous-cobaltic oxide, black nickel oxide and manganese dioxide are suitable starting materials in the process of this invention. The black oxide of nickel commercially available contains no metallic nickel and contains a slight excess of oxygen over that theoretically required by the formula NiO.

The proportions of the two oxides are not critical since widely varying proportions of the two reactants give the desired ferromagnetic oxide. Reaction mixtures of group VIII metal oxide and manganese dioxide which are operable include those having an atomic ratio of group VIII metal to manganese ranging from 2:1 to 1:4. With atomic ratios other than 1:1, larger proportions of undesired nonmagnetic by-products are produced. However, when an excess of manganese dioxide is used, it is easier to isolate magnetic cobalt or nickel manganese oxides of higher purity. Free manganese can be present in the reaction mixture if desired; however, the presence of free manganese has little effect on the yields of the desired ferromagnetic oxides. In the preparation of the ferromagnetic cobalt manganese oxide, the preferred molar ratio of reactants is one mole of the cobaltous-cobaltic oxide to three moles of manganese dioxide. On the other hand, the preferred molar ratio of black nickel oxide to manganese dioxide is 1:2.

The two oxides can be heated together in a dry state, but they are preferably heated in an aqueous medium since better yields of the desired ferromagnetic oxide are obtained under aqueous conditions. The aqueous reaction medium can be water alone or it can be dilute aqueous solutions of inorganic acids or of inorganic bases. The amount of aqueous medium employed is not critical. The reaction takes place with no aqueous medium present and it also takes place in the presence of an aqueous medium in amount up to 1½ times the weight of the oxides present, or more. The basic and the acidic solutions can have concentrations up to 25% or more. In reacting cobaltous-cobaltic oxide with manganese dioxide, best yields of the ferromagnetic cobalt manganese oxide are obtained when the reaction is carried out in the presence of 30%, based on the total weight of metal oxides present, of a 5% aqueous solution of sulfuric acid. However, in the preparation of nickel manganese oxide, the best yields are obtained when the metal oxides are heated in the presence of 30%, based on total weight of metal oxides present, of a 5% aqueous solution of sodium hydroxide.

The ferromagnetic cobalt and nickel manganese oxides of this invention are useful in the many applications in which magnetic oxides are normally employed, for example, as the ferromagnetic coating of magnetic recording tapes, and as magnetic core materials, such as coil core material for use in electronic equipment. This invention provides a novel type of ferromagnetic oxides of high quality.

As many apparently widely different embodiments of this invention may be made without departing from the spirit and scope thereof, it is to be understood that this invention is not limited to the specific embodiments thereof except as defined in the appended claims.

I claim:

1. The crystalline form of a complex oxide of manganese, corresponding to the formula $MMnO_3$ wherein M is a group VIII metal selected from the class consisting of cobalt and nickel, characterized by having a crystal structure of the ilmenite-type and by being ferromagnetic.

2. The crystalline form of a complex oxide of manganese and cobalt, corresponding to the formula $CoMnO_3$, characterized by having a crystal structure of the ilmenite-type and by being ferromagnetic.

3. The crystalline form of a complex oxide of manganese and nickel, corresponding to the formula $NiMnO_3$, characterized by having a crystal structure of the ilmenite-type and by being ferromagnetic.

4. The crystalline form of a complex oxide of manganese and cobalt, corresponding to the formula $CoMnO_3$, characterized by having a crystal structure of the ilmenite-type with cell parameters of $a_0=4.93$ and $c_0=13.77$, and by being ferromagnetic.

5. The crystalline form of a complex oxide of manganese and nickel, corresponding to the formula $NiMnO_3$, characterized by having a crystal structure of the ilmenite-type with cell parameters of $a_0=4.91$ and $c_0=13.61$, and by being ferromagnetic.

6. As a new ferromagnetic material, the crystalline form of a complex oxide of manganese and cobalt, corresponding to the formula $CoMnO_3$, characterized by having a crystal structure of the ilmenite-type, by being ferromagnetic, and by exhibiting a coercive force of about 150 oersteds after magnetization in a 14,000 gauss field.

7. As a new ferromagnetic material, the crystalline form of a complex oxide of manganese and nickel, corresponding to the formula $NiMnO_3$, characterized by having a crystal structure of the ilmenite-type, by being ferromagnetic, and by exhibiting a coercive force of about 400 oersteds after magnetization in a field of 14,000 gauss.

8. Process for preparing a ferromagnetic crystalline complex oxide of manganese which comprises heating a mixture of manganese dioxide and a simple oxide of a metal selected from the class consisting of cobalt and nickel at a temperature of at least 500° C., and under a pressure of at least 1000 atmospheres, and separating as the resulting product a crystalline complex oxide of manganese and a metal selected from the class consisting of cobalt and nickel which has the ilmenite-type crystal structure and is ferromagnetic.

9. Process for preparing a ferromagnetic crystalline complex oxide of manganese which comprises heating a mixture of manganese dioxide and a simple oxide of a metal selected from the class consisting of cobalt and nickel, in contact with an aqueous medium, at a temperature of 500 to 800° C., and under a pressure of 1000 to 5000 atmospheres, and separating as the resulting product a crystalline complex oxide of manganese and a metal selected from the class consisting of cobalt and nickel which has the ilmenite-type crystal structure and is ferromagnetic.

10. Process for preparing a ferromagnetic crystalline complex oxide of manganese as set forth in claim 9 wherein said aqueous medium is a dilute aqueous solution of an inorganic acid.

11. Process for preparing a ferromagnetic crystalline complex oxide of manganese as set forth in claim 9 wherein said aqueous medium is a dilute aqueous solution of an inorganic base.

12. Process for preparing a ferromagnetic crystalline complex oxide of manganese and cobalt which comprises heating a mixture of manganese dioxide and cobaltous-cobaltic oxide, in contact with an aqueous medium, at a temperature between 550 and 700° C., and under a pressure between 2000 and 5000 atmospheres, and separating as the resulting product a crystalline complex oxide of manganese and cobalt which has the ilmenite-type crystal structure and is ferromagnetic.

13. Process for preparing a ferromagnetic crystalline complex oxide of manganese and nickel which comprises heating a mixture of manganese dioxide and nickel oxide, in contact with an aqueous medium, at a temperature between 550 and 700° C. and under a pressure between 2000 and 5000 atmospheres, and separating as the resulting product a crystalline complex oxide of manganese and nickel which has the ilmenite-type crystal structure and is ferromagnetic.

References Cited in the file of this patent

UNITED STATES PATENTS

| 1,971,168 | Weiss | Aug. 21, 1934 |
| 2,645,700 | Morin | July 15, 1953 |
| 2,677,663 | Jonker et al. | May 4, 1954 |

OTHER REFERENCES

Salinger: "Zeitschrift für Anorganische Chemie," Band 33, 1903, pages 322, 350–352.